United States Patent
Klotz

(10) Patent No.: US 10,087,017 B2
(45) Date of Patent: Oct. 2, 2018

(54) DEVICE AND METHOD FOR INTERVENING ON A CONVEYOR LINE

(71) Applicant: GEBO CERMEX CANADA INC., Laval (Quebec) (CA)

(72) Inventor: Franck Klotz, Laval (CA)

(73) Assignee: GEBO CERMEX CANADA INC., Laval (Quebec) (CA)

(*) Notice: Subject to any disclaimer, the term of this patent is extended or adjusted under 35 U.S.C. 154(b) by 0 days.

(21) Appl. No.: 15/316,342

(22) PCT Filed: Jun. 6, 2014

(86) PCT No.: PCT/IB2014/000999
§ 371 (c)(1),
(2) Date: Dec. 5, 2016

(87) PCT Pub. No.: WO2015/185957
PCT Pub. Date: Dec. 10, 2015

(65) Prior Publication Data
US 2017/0267462 A1    Sep. 21, 2017

(51) Int. Cl.
*B65G 47/256*    (2006.01)
*B65G 47/91*    (2006.01)

(52) U.S. Cl.
CPC ........... *B65G 47/256* (2013.01); *B65G 47/91* (2013.01); *B65G 2203/0225* (2013.01); *B65G 2203/041* (2013.01); *B65G 2203/044* (2013.01)

(58) Field of Classification Search
CPC .................................................... B65G 47/256
USPC ................................................. 198/395, 401
See application file for complete search history.

(56) References Cited

U.S. PATENT DOCUMENTS

| 3,506,840 A * | 4/1970 | Fink .................. B07C 5/126 |
| | | 198/395 |
| 3,610,399 A | 10/1971 | Friedrich et al. |
| 3,710,922 A * | 1/1973 | Lanphere ............. B65G 47/256 |
| | | 198/395 |

(Continued)

FOREIGN PATENT DOCUMENTS

DE    43 32 461 A1    8/1994
DE    201 10 686 U1    8/2002

(Continued)

OTHER PUBLICATIONS

International Search Report, dated Sep. 11, 2014, from corresponding PCT Application.

(Continued)

*Primary Examiner* — Joseph A Dillon, Jr.
(74) *Attorney, Agent, or Firm* — Young & Thompson

(57) ABSTRACT

An intervention device (1) for a conveyor line conveying products to be moved in an upright position, i.e. the largest dimension thereof being perpendicular to the normally horizontal conveying plane, such as bottles of liquid, the device including: a detection module (2) for detecting the position of the products in a detection area (3) on the conveyor line; a removal module (4) for gripping and removing products that are lying down from a removal area (5) on the conveying line; and a control module (6) receiving information from the detection module (2) and controlling the removal module (4) accordingly. A corresponding method is also described.

18 Claims, 4 Drawing Sheets

(56) References Cited

U.S. PATENT DOCUMENTS

| | | | | |
|---|---|---|---|---|
| 3,730,325 A * | 5/1973 | Goodwin | B07C 5/02 | 198/395 |
| 4,354,865 A | 10/1982 | Pond et al. | | |
| 4,421,542 A * | 12/1983 | Poad | B07C 5/122 | 209/3.2 |
| 4,494,656 A * | 1/1985 | Shay | G01V 8/12 | 209/524 |
| 4,530,430 A * | 7/1985 | Peterlini | B65G 47/244 | 198/395 |
| 4,819,784 A * | 4/1989 | Sticht | B07C 5/02 | 198/395 |
| 5,299,639 A | 4/1994 | Williams et al. | | |
| 5,299,693 A † | 4/1994 | Ubaldi | | |
| 5,348,133 A * | 9/1994 | Powell | B65G 47/256 | 198/380 |
| 5,370,216 A * | 12/1994 | Tsuruyama | B25J 9/1697 | 198/376 |
| 5,727,132 A | 3/1998 | Arimatsu et al. | | |
| 5,924,546 A * | 7/1999 | Funaya | B65G 47/256 | 198/395 |
| 6,229,108 B1 * | 5/2001 | Gaglione | B65G 47/256 | 198/394 |
| 7,591,364 B2 | 9/2009 | Monti | B65B 21/04 | 198/443 |
| 8,694,151 B2 * | 4/2014 | Jendrichowski | B65G 47/912 | 198/395 |
| 8,813,944 B2 * | 8/2014 | Tanner | B65G 47/256 | 198/389 |
| 8,880,216 B2 * | 11/2014 | Izumi | B25J 9/1697 | 198/395 |
| 8,931,240 B2 * | 1/2015 | Lindee | B25J 9/0093 | 53/251 |
| 9,010,519 B2 * | 4/2015 | Handschick | B07C 5/122 | 198/395 |
| 2008/0283370 A1 * | 11/2008 | Monti | B65B 21/04 | 198/867.01 |
| 2010/0101191 A1 * | 4/2010 | Lindee | B25J 9/0093 | 53/471 |
| 2010/0107835 A1 * | 5/2010 | Lindee | B25J 9/0093 | 83/23 |
| 2010/0107836 A1 * | 5/2010 | Lindee | B25J 9/0093 | 83/23 |
| 2010/0174394 A1 | 7/2010 | Jendrichowski | | |
| 2012/0261232 A1 * | 10/2012 | Nakajima | B65G 47/1414 | 198/395 |
| 2014/0090956 A1 * | 4/2014 | Lindee | B25J 9/0093 | 198/379 |
| 2015/0258727 A1 * | 9/2015 | Heller | B65G 47/256 | 198/373 |
| 2017/0088365 A1 * | 3/2017 | Aoyama | B65G 47/256 | |
| 2017/0233197 A1 * | 8/2017 | Keller | B65G 47/82 | 198/401 |

FOREIGN PATENT DOCUMENTS

| | | |
|---|---|---|
| EP | 1 992 561 A2 | 11/2008 |
| EP | 2 295 156 | 3/2011 |
| EP | 2479123 † | 7/2012 |
| EP | 2479123 A1 | 7/2012 |
| EP | 2479123 B1 | 4/2014 |
| JP | H4-100116 A | 4/1992 |
| JP | 6-42954 B2 | 6/1994 |
| JP | H0642954 † | 6/1994 |
| JP | 6-331333 A | 12/1994 |
| JP | H7-125828 A | 5/1995 |

OTHER PUBLICATIONS

Third party observation, dated Jul. 3, 2017, from corresponding European Application No. EP14894122.2.
European Search Report dated Oct. 19, 2017; Application No. 14894122.2.

* cited by examiner
† cited by third party

DEVICE AND METHOD FOR INTERVENING ON A CONVEYOR LINE

TECHNICAL FIELD AND PRIOR ART

This invention relates to the field of the conveying of products such as bottles, cans, jars, or the like, and has as its object, on the one hand, a particular device for intervention, and, on the other hand, a particular method for intervention.

The products covered by the conveying solutions of the invention have a long dimension that is much larger relative to the other dimensions, which has the effect of making the products less stable and therefore more susceptible to falling when this long dimension is vertical. This is the case, for example, with bottles, jars, canisters, spray cans, etc., which are normally conveyed with their long dimensions oriented vertically. The conveying of products is in particular necessary to transfer the products between the various processing stations in a line, for example: production, filling, labeling, case packing, palletizing, etc. The conveying can also be used for accumulation functions.

In the field of the invention, the products are placed vertically on conveyors, whose upper part forms a conveying plane and whose movement has the effect of carrying along the products within a conveyor line in a conveying direction.

Products falling down can be caused by various phenomena, such as going from one conveyor to another for example, impacts between products or with guides, or even excessive speed, etc. In addition, in the case of bottles, for example, the products have a tendency to fall down because they are structurally becoming increasingly less sturdy and increasingly lighter. The products, normally standing up, are then lying down on the conveyor.

The arrival of a product that is lying down at a processing station is, of course, to be avoided, since that can impair the machine at said station, cause stoppages, etc.

The invention thus has as its object to improve the state of the art in the way described above and aims in particular to propose a solution that makes it possible in general to avoid the disturbances caused by products that are lying down.

BRIEF DESCRIPTION OF THE INVENTION

For the purpose of attaining the objective cited above, the invention proposes essentially to identify and automatically remove products that are lying down.

The invention thus first has as its object a device for intervening for a line for conveying products on a conveyor standing up, i.e., with their long length perpendicular to the conveying plane, normally horizontal, such as bottles of liquid, comprising a detection module, to detect the position of the products within a detection zone in the area of the conveyor line, in particular to detect if the products are lying down there, i.e., with their long length parallel to the conveying plane, a removal module, to grab and remove from the conveyor line the products that are lying down, and this from a removal zone in the area of the conveyor line, as well as a control module, which receives information from the detection module and which consequently manages the removal module.

The invention also has as its object a method for intervening on a line for conveying products that are normally standing up, for using a device as described above. This method comprises stages consisting essentially in identifying products in a lying-down position thanks to measures taken in a detection zone within the conveyor line, and then in removing, from a removal zone within the conveyor line, the candidates identified as products that are lying down.

FIGURES

Figure 3:
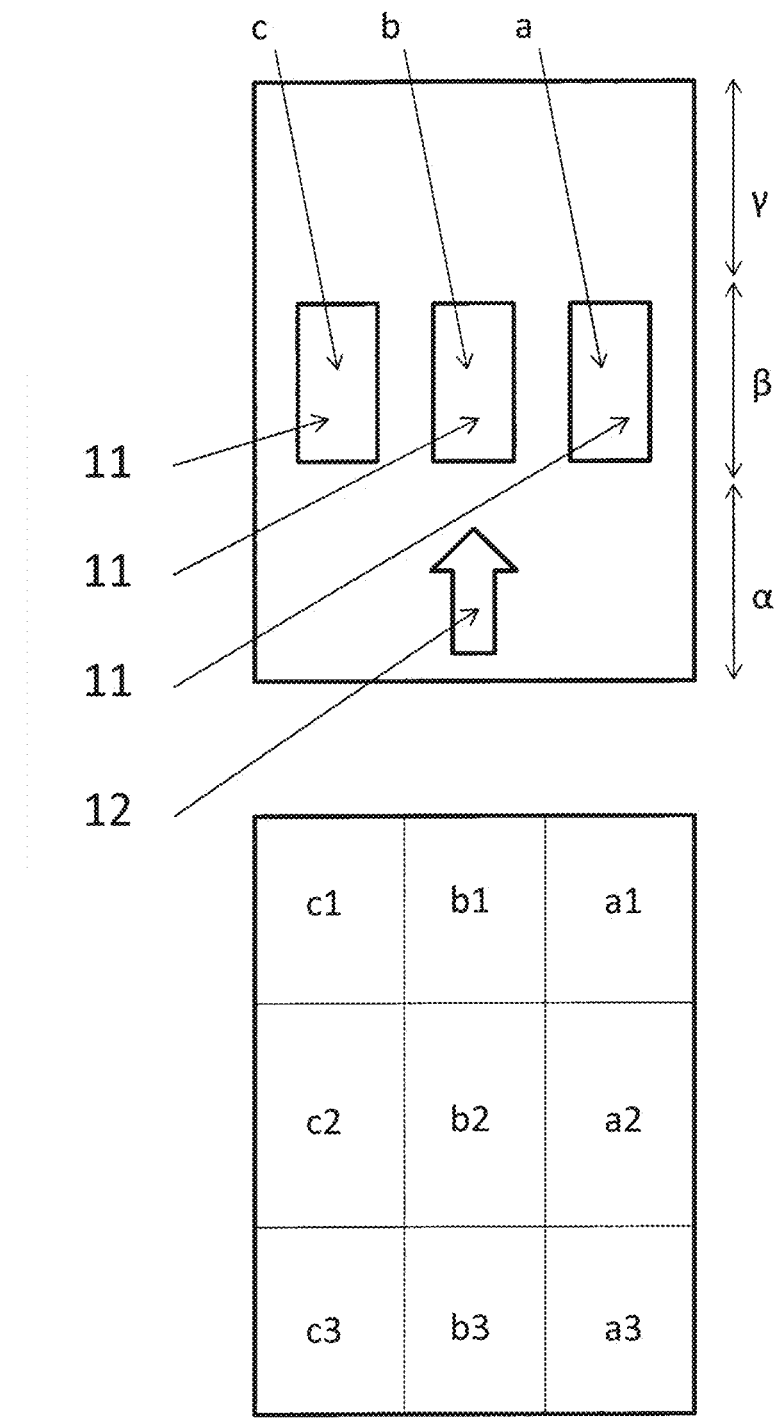

FIG. 3 diagrams the processing method when the detection means comprise three detection cells distributed crosswise.

Figure 4:
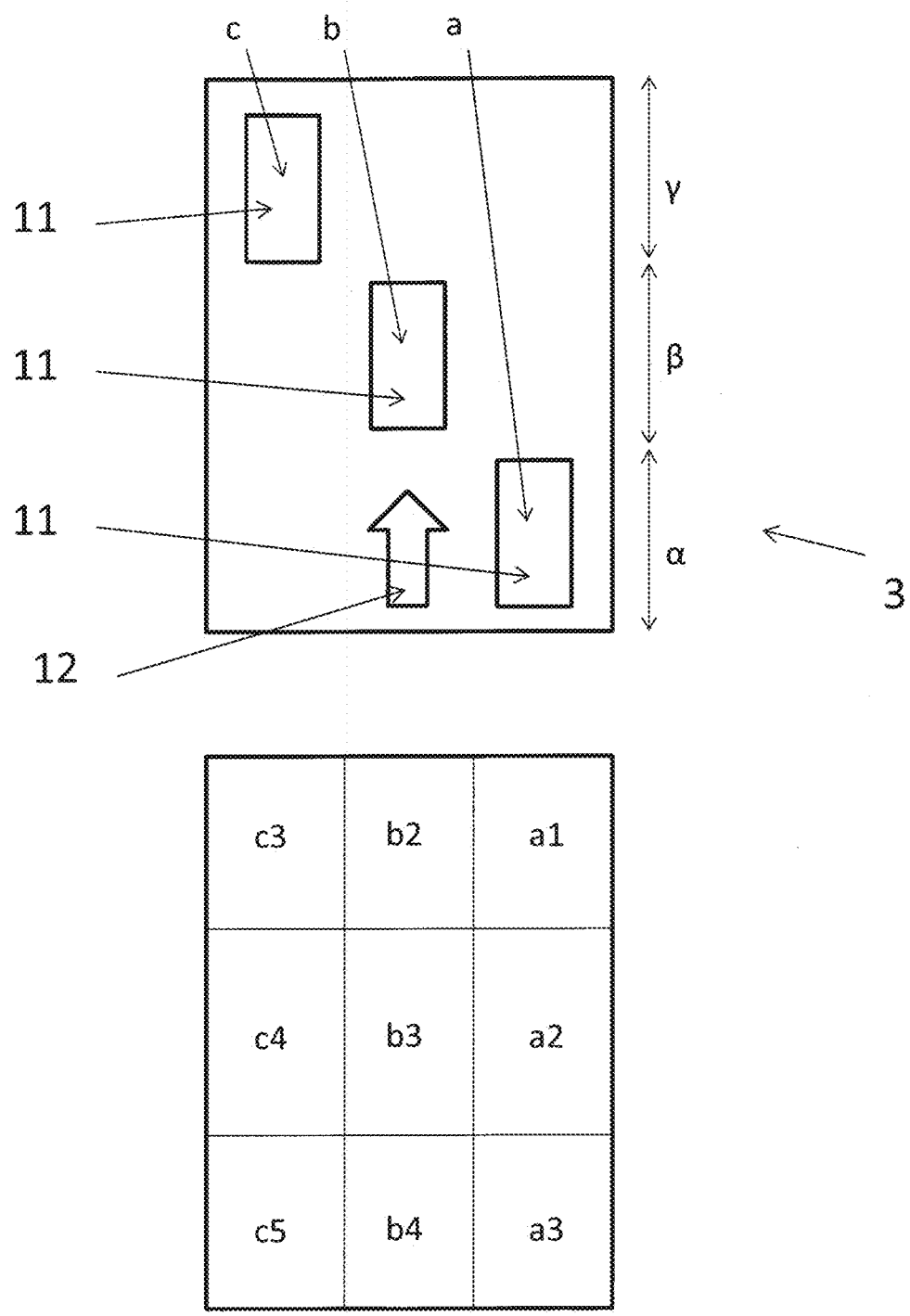

FIG. 4 is equivalent to FIG. 3 for the case where the cells are, furthermore, offset longitudinally.

EMBODIMENTS

The invention will be better understood with the help of the description below, which is based on possible embodiments, explained in a manner that is illustrative and in no way limiting, with reference to the accompanying figures.

The invention thus has as its object an intervention device 1 for a line for conveying products to be conveyed standing up, i.e., with their long length perpendicular to the conveying plane, normally horizontal, products such as bottles of liquid, comprising a detection module 2, to detect the position of the products within a detection zone 3 in the area of the conveyor line, in particular to detect if the products are lying down there, i.e., with their long length parallel to the conveying plane, a removal module 4, to grab and remove from the conveyor line the products that are lying down, and this from a removal zone 5 in the area of the conveyor line, as well as a control module 6, which receives information from the detection module 2 and which consequently manages the removal module 4.

In the framework of normal conveying, the long length of the product is therefore perpendicular to the conveying plane, the latter being normally horizontal. Of course, a slight inclination can be envisaged for the needs of the installation. The detection zone 3 is essentially defined by the range of the detection module 2, and is therefore stationary, like said module. The removal zone 5 is essentially defined by the range of movement of the removal means 4.

Two different structural configurations are possible, depending on whether the intervention device 1 comprises or does not comprise the means for conveying the products. Thus, in some cases, the intervention device 1 takes the form of a segment of a conveyor line if it comprises the conveyors, or else of a piece of equipment that can be added to an already existing conveyor line, for example as an additional option on an already functional line, in the case where it does not comprise a conveyor.

Furthermore, the intervention device 1 also optionally comprises a means 8 for tracking the change in the position of the products within the conveyor line in the area of the detection zone 3 and of the removal zone 5, said tracking means 8 being connected to the control module 6. In the cases where the intervention device 1 is intended to be added back onto an existing line, this tracking means 8 must naturally be compatible with the existing conveying. In the cases where the intervention device 1 itself comprises the conveying means and thus forms a segment of the line, the tracking means 8 can be incorporated more with the conveyor, as in the form of an encoding unit that is directly incorporated with the motors of the conveyor, for example. In absolute terms, the tracking means 8 can identify the change in the position of the conveyor in different ways, such as by, for example, visual observation of the advance of one or more reference markings on the conveyor, etc.

As has already been mentioned, in certain embodiments, the intervention device 1 comprises a means 7 for conveying products, of the conveyor 7 type, ensuring their movement in the area of the detection zone 3 and/or in the area of the removal zone 5, the intervention device 1 then taking the form of a segment of the conveyor line. The conveying means 7, i.e., the conveyor 7 in general, preferably ensures the movement within the two zones, namely the removal zone 5 and the detection zone 3. In these embodiments, the intervention device 1 further comprises a means 8 for tracking the advance of the conveying means 7, so as to be able to follow the changing of the position of the products thanks to the conveyor that it comprises. It can be, for example, a stepper encoder associated with a shaft of the conveying means 7, driving or driven. Advantageously, said tracking means 8 sends a signal that is representative of said advance to the control module 6.

The removal module 4 is used to grab the products and remove them from the conveyor 7 from the removal zone 5. Different embodiments are possible, and indeed can be combined within the same embodiment: the removal module 4 uses at least one articulated robot 9 at the end of which a product gripping tool 10 is found, and/or the removal module 4 uses at least one structure with linear guides to move a product gripping tool 10, particularly with linear guiding of the guide rail type, augur type, etc. The kinematics are used essentially to move a product gripping tool 10, namely to bring it close enough to the products so that it can grab them, and then remove them from the conveyor.

Figure 1:
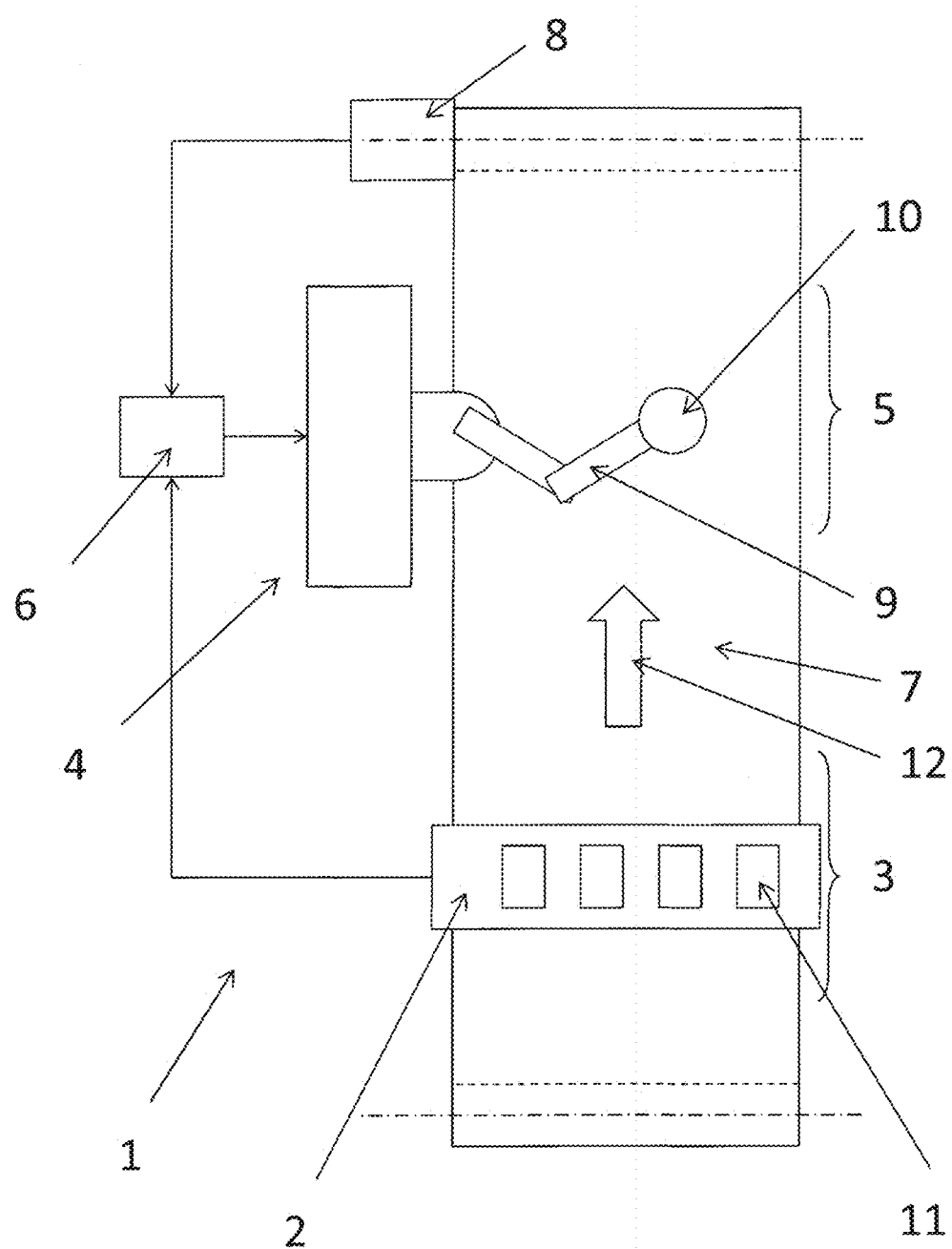
FIG. 1 illustrates, seen from above, a portion of the conveyor line where the intervention device is installed.

According to a possible additional characteristic, the intervention device 1 comprises at least one product gripping tool 10 that takes the form of a pincer to grab the products in the manner of a vise, said pincer being rigid or even deformable in the area of its jaws. Alternately or in addition, the intervention device 1 comprises at least one product gripping tool 10 that uses a suction cup, which makes it possible to access the products only from the top. The pincer and suction cup are schematically illustrated by element 10 in FIG. 1.

Different embodiments of the detection module 2 are possible. Thus, in certain embodiments, the detection module 2 uses visual means to identify the position of the products, such as a camera, for example, which analyzes visually a segment of the flow for a linear camera, or else a surface area for a traditional camera. In these cases, the device also comprises in particular an additional light source to illuminate the products, in the range that may or may not be visible to the eye, illuminating likewise in the conveying plane to provide a lateral lighting or that lights perpendicular to said plane to provide a lighting from above or from below, the conveyor having, in this latter case, an at least partial permeability to the projected light.

Figure 2:
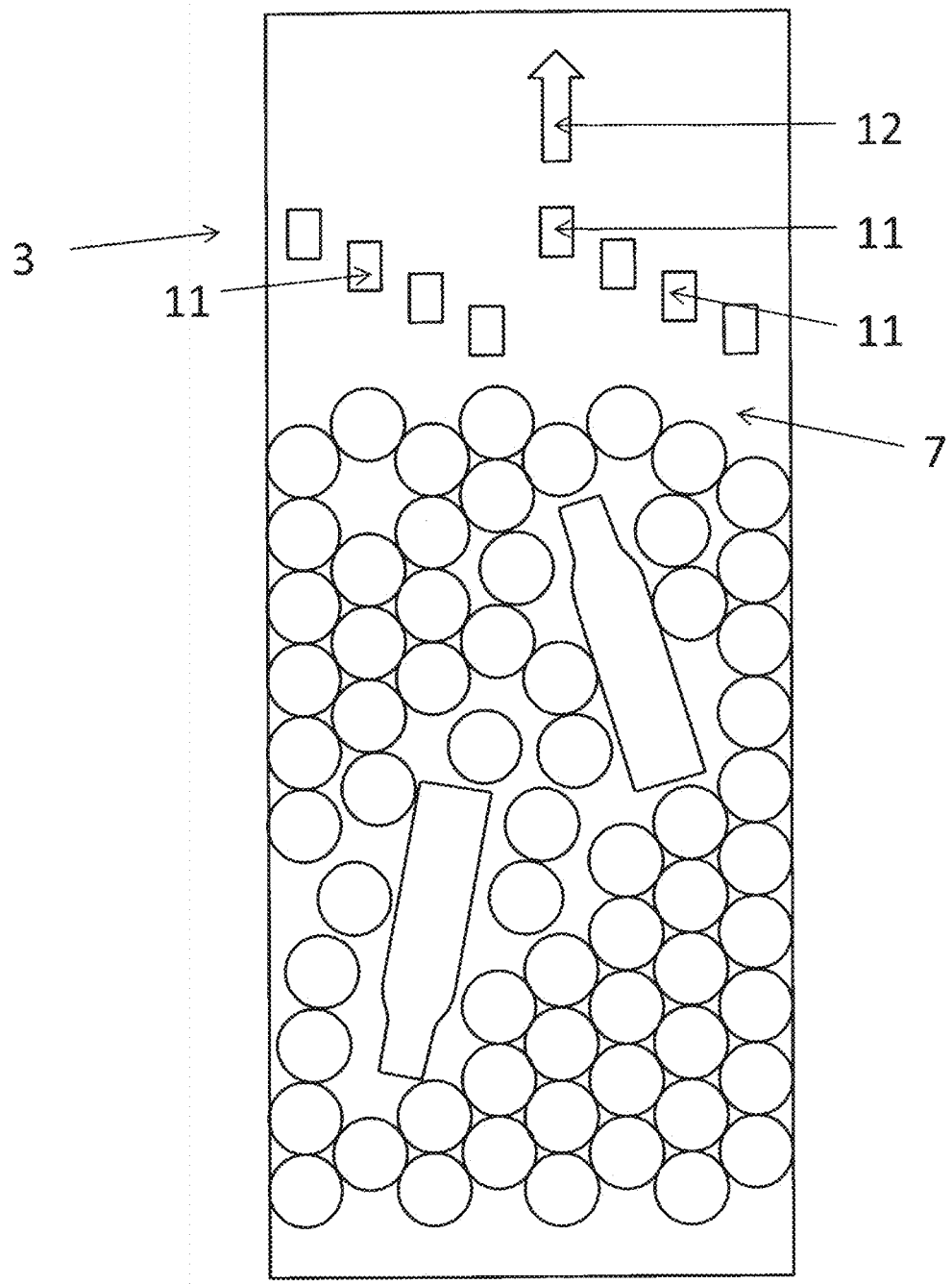
FIG. 2 illustrates, seen from above, the arrival of a flow of products in which two products that are lying down are found.

The detection of products that are lying down necessitates characterizing the flow of products observed in the detection zone 3. Visual means can thus be used to detect gaps in the normal sequence of staggering of the products, see, for example, FIG. 2, or else of tracking a label that is normally visible from above only if the product is lying down, etc. It is also possible to characterize the flow based on its height, and therefore on the height that the products occupy that constitute it. In these cases, a product height measurement is taken, and the detection module 2 identifies the highest part of the products, in particular while identifying the distance from the product relative to a sensor, or detection cell 11, placed above the conveying plane, by ultrasound, laser, or other compatible technology. This can be done in particular by detecting that said highest part is found at a height that corresponds to a lying-down position, to an abnormal height, to a height that corresponds to a standing position, or else by quantifying the height of the highest part of the products.

Preferably, the intervention device 1 comprises a means for calibrating the detection module 2, whose design may depend on the type of detection cell 11 that it comprises. Thus, in certain cases, the detection module 2 comprises at least one detection cell 11, the means for calibrating the detection module 2 modifying the distance from the at least one detection cell 11 relative to the conveying plane on which the products are located, this modification being able in particular to be manual or by an actuator. In other cases, the calibrating means takes the form of a parameterization of the processing logic of the detection module 2 and/or of the control module 6.

Apart from the possible variations relative to the nature of the characteristic that is identified on the flow of products, the phenomenon exploited, the regulations, etc., the detection module 2 can also measure different parts of the flow, namely measure instantaneously a gap in the flow that is great enough to detect any type of product that is lying down, or measure instantaneously a section of the flow.

Thus, in certain embodiments, the detection module 2 analyzes a detection zone 3 that, in relation to the conveying direction 12 of the products, extends longitudinally over a distance that is high enough to detect instantaneously a product that is lying down and that is aligned in the longitudinal direction, and also extends transversely, preferably over the entire width of the flow. This can be done, for example, with a camera that has a field of vision in two dimensions. Alternately, the detection module 2 analyzes a section of the flow that extends transversely to the conveying direction 12. The flow is then characterized for a gap that is sufficient by calculation.

In certain embodiments, the detection module 2 comprises a plurality of detection cells 11, distributed and spaced apart relative to one another in a direction that is transverse to the conveying direction 12, as FIGS. 3 and 4 show. The detection module 2 advantageously comprises a sufficient number of detection cells 11 to cover the entire width of the flow of the product. In the particular case of FIG. 4, the detection cells 11 are also distributed and separated relative to one another in the conveying direction 12, which can be useful to resolve mutual interference between the detection cells 11.

The invention also has as its object a method for intervening on a line for conveying products that are normally standing up, for the implementation of a device as described above in all of its variants.

The method comprises stages consisting essentially in identifying products in a lying-down position thanks to measurements taken in a detection zone 3 within the conveyor line, and then in removing, from a removal zone 5 within the conveyor line, the candidates identified as products that are lying down, and this in particular by ensuring a synchronization with the movement of the products within said zone.

In certain embodiments, the removal stage permanently eliminates the product from the conveyor line. Alternately, the removal stage puts the product back into circulation in the conveyor line.

The removal module 4 naturally has limits in terms of amount and speed. Thus, when too many products are lying down and/or when the conveyors in the detection zone 3 and removal zone 5 are too fast, the removal module 4 may be unable to ensure the removal of all of the products. To avoid the problems that this can cause, and according to a possible additional characteristic, the method comprises, furthermore, a stage consisting essentially in evaluating the capacity of the intervention device 1 to remove the products before they leave the removal zone 5, in particular taking into account, on the one hand, the working speed of the removal module 4, and, on the other hand, the movement of the products within the removal zone 5 and the number of candidates to be processed. Then, special instructions are sent if it is concluded that there is an inability to remove the products before they leave the removal zone 5, said instructions having, for example, the effect of slowing down, and even stopping, the movement of the products within the removal zone 5, to introduce an additional removal mechanism, or even to trigger an alarm, etc.

In possible embodiments of the method, the identification of the products in a lying-down position takes place visually, identifying, for example, from above gaps in the expected sequence of staggering of the products or that detects a label that should be vertical. Alternately, the identification of the products in the lying-down position is based on the height occupied by the products, more particularly on the detection of products whose highest wall, relative to the surface on which the product rests, i.e., the conveying plane, is found at a height that corresponds to a lying-down position.

The detection of the products that are lying down necessitates characterizing the flow over a great enough surface area, in particular long enough in the conveying direction 12 and perpendicular to it. Thus, in certain embodiments, the identification of the products in a lying-down position takes place by an instantaneous analysis of a portion of the flow that extends in the conveying direction 12 of the products so as instantaneously to monitor a surface area of the flow of products, in particular a surface area that is rather extended longitudinally to cover at least entirely a product that is lying down horizontally. Alternately, the identification of the products in a lying-down position takes place by an analysis of a portion of the flow that forms only a section of it, so as instantaneously to monitor the flow of products in a short-length section in the conveying direction 12 of the products. It is then enough to heed not only the measurements taken but also the prior measurements to characterize a sufficient surface area of the flow. Thus, the characteristics of successive sections of the flow are used to characterize the flow of products in a surface area that extends longitudinally over a sufficient length to contain at least one product that is lying down longitudinally in the conveying direction 12.

To avoid interference between the detection cells 11, it can be advantageous to offset them in the conveying direction 12. Then, so far as the method is concerned, the characteristics of the analyzed section of the flow are determined by measurements taken at points spaced apart from one another in the conveying direction 12 of the products.

In the particular embodiment illustrated in the accompanying figures, the conveyed products are of the bottle type, and are therefore similar to a shape that has, on the one hand, a base section, and, on the other hand, a long length along which this base section extends. Opposite the base is generally found the neck of the bottle. The base can be flat or have petal-shaped protrusions, for example.

In normal conveying, the products are standing up, and are therefore found with their base resting against the conveyors, in the area of the conveying plane, the latter being essentially horizontal. The base is then horizontal, and the long length is vertical. Since the dimension of the long length of the product is higher than that of the base section, a conveying in this position makes it unstable. Impacts or another transverse force can easily cause them to fall.

An abnormal conveying position is one where the products are lying down, their long length then being parallel to the conveying plane, i.e., horizontal, their base being essentially vertical.

The long length of the product can then be oriented in any way relative to the conveying direction: parallel, perpendicular, or, generally, any other angle. It is important to detect a product that would be lying down on the conveyor, and this regardless of its orientation relative to the conveying direction. The method and the associated means to do this within the scope of the invention are described below.

The device that is illustrated in the accompanying figures thus makes it possible, on the one hand, to detect products that are lying down, i.e., to identify candidates for removal, and, on the other hand, to remove them from the conveyor line to prevent them from causing a subsequent stoppage or from degrading a machine downstream.

The illustrated device thus comprises a detection module 2, which makes it possible to identify, within the flow of products that are normally standing up, the presence of products that are lying down. Different technologies can be used: vision, laser, infrared, ultrasound, etc. The detection module 2 therefore works continuously and observes the flow of products, so as to monitor at least one characteristic thereof, which, after processing, makes it possible to detect products that are lying down.

The detection module 2 is preferably stationary and therefore observes instantaneously and constantly the flow of products in a stationary passage area, where the products pass by. The detection module 2 that observes this zone therefore has the function not only of detecting the presence of products that are conveyed lying down, but also of identifying the position on the conveyors, including the orientation relative to the longitudinal axis. The identification of the position of the products that are lying down, on the one hand, and the information in regard to the circulation speed of the conveyors, on the other hand, then make it possible to know where the products that are lying down are found, even after going outside of the range of the detection module 2.

The detection module 2 is therefore stationary and monitors the flow of products in the area of a detection zone 3, which is itself also stationary and where all the products pass by.

The device also comprises a removal module 4, which essentially has the function of grabbing the products that are lying down and removing them from the conveyor line. Preferably, the products are grabbed individually. In the embodiment illustrated, the device is based on a robot with articulations at the end of which a gripping tool 10 is mounted. The removal module 4 grabs the products when they have left the detection zone 3 and are found in a removal zone 5, it also being stationary.

The robot with articulations is mounted on a stationary frame, placed laterally beside the conveyors. This frame extends vertically so that the base of the robot is secured on a vertical plane. The robot extends above the conveyors, from its base, mounted on a structure that is situated beside them. It therefore extends overhanging above the conveyor line, from the side. This mounting makes it possible in particular to prevent the operating zone of the robot, i.e., the zone where it can grab products in view of its range of movement, from being reduced by a support structure of the robot that would be placed above the conveyors and that would therefore block access, for the robot, to a portion of the surface of the conveyors. In the embodiment illustrated, a gripping tool 10 is therefore mounted at the end of an articulated robot. Alternately, or additionally, a gripping tool 10 can be mounted on an assembly of linear guides for additional directions. Of course, several gripping tools 10 can be provided, at the end of the same movement means such as an articulated robot or linear guides, or even mounted on different movement means.

The intervention device 1 also comprises a control module 6 that essentially has the function of managing the removal module 4. The information that is representative of the position of the products in the flow, namely the location, within the flow, of the products that are lying down and that are candidates for removal, is sent by the detection module 2 to the control module 6. So as to manage the removal module 4, information that is representative of the movement of the group of products within the conveyor line is also necessary. Actually, the control module 6 can analyze the flow in a fixed portion to detect candidates there, but since the products move under the effect of the conveyors, it is necessary to know their movement so as to be able at any moment to bring the gripping tool 10 from the removal module 4 to where the conveyors have taken the candidates. Further, as will be described below, the characterization of a sufficient surface area of the flow of product can necessitate taking into account the advance of the products.

The control module 6 therefore also receives information that is representative of the advance of the conveyors, at least for the removal zone 5 and for the detection zone 3. A single conveyor is preferably used to move the products within the intervention device 1 and therefore through these two zones. The control module 6 therefore receives coded information that is representative of the advance of this conveyor, which is, for example, made possible by using a conveyor driven by a motor whereby it is possible to follow the exact position.

In the embodiment illustrated, the intervention device 1 takes the form of an assembly that can be added in the area of a segment of a conveyor line, this segment being sufficiently long to accommodate the detection zone 3 and the removal zone 5. The intervention device 1 then does not comprise the conveyor itself, but reuses an existing conveyor on the line. In this type of embodiment, as has already been stressed above, it is still necessary to collect the information that is representative of the movement of the conveyor of the existing line. To do this, when the conveyor line is equipped with it and when the devices are compatible, it is possible to reuse the existing coding for the position of the conveyor and to connect the control module 6 thereto. For the lines where information that is representative of the position of the belt is not available, the intervention device 1 itself comprises a tracking means 8 to follow the advance of the products: a sensor of movement of the belt, a particular shaft, a particular motor, a coder, etc.

The advantage of the embodiment as illustrated is that it can easily be added onto an existing conveyor line, since it reuses an existing conveyor in said line, on the one hand, to detect the position of the products there, and, on the other hand, to remove from it candidates detected as products that are lying down.

An important aspect of good operation is also that, during the removal stage, the gripping tool 10 is driven only in a movement that is perpendicular to the conveying plane. Actually, during the removal stage, the gripping tool 10 must descend near the conveying plane to come into contact with the products that are lying down and grab them. If, during this stage, the position of the gripping tool 10 is not correctly synchronized with that of the products standing up, the latter risk colliding with said tool, which could cause falls. Ideally, during the removal of the product that is lying down, the gripping tool 10 must be driven, relative to the conveyor, only in a vertical movement, so as to avoid any collision with the products standing up. The gripping tool 10 must therefore be driven, during the removal stage, in a longitudinal movement that is similar to that of the conveyor, to guarantee this function known as "tracking," or of following the advance of the products. It is therefore also for this reason that the control module 6, which manages the removal module 4 and therefore the movement of the gripping tool 10, must continuously be informed of the position and of the advance of the products placed on the conveyor, i.e., the position of the conveyor. Actually, for purposes of regulating the line, it is entirely possible temporarily to slow down the conveyors, and even stop them, as will be, for example, envisaged below.

As the gripping tool 10 is inserted into the flow of products from above, it is necessary to ensure that it does not collide with the other products that are standing up. Thus, the gripping tool 10 preferably has an elongated shape that is slim enough to be inserted into the flow of products without touching the products that are standing up, around a product that is lying down, and this regardless of the position of the products that are standing up and surrounding the product that is lying down and that is to be removed. The use of a suction cup to grab the products then makes it possible to grab the products only by the top, which avoids having, for example, to separate the standing products that surround a product that is lying down to make room for the jaws of a pincer. To grab the products only from the top then makes it possible to avoid having the products fall because of the gripping tool 10.

The removal module 4 has a certain geometric range of operation, considering its construction and its size. Thus, it is impossible for it to grab products if they are too far away. In certain cases, the capacity of the removal module 4 to act can therefore be insufficient considering the high number of products that are lying down, the high conveying speed, but also the reduced range of the removal module 4 and its speed of movement. Advantageously, the intervention device 1 therefore evaluates, based on the data provided to the control module 6 and on the characteristics of the removal module 4, the capacity of the latter to withdraw all of the candidates, i.e., to remove each candidate before it can no longer be accessed, i.e., before it leaves the removal zone 5. The detection module 2 thus uses the data supplied by the detection module 2, relating to the products that are lying down, as well as the data supplied by the tracking means 8 to follow the advance of the products.

Different performances can be anticipated if it is concluded that the removal module 4 will not be able to remove each product. For example, it is possible to force a reduction in the conveying speed to a sufficiently low value to ensure that the removal module 4 can fulfill its function, optionally to come to a full stop, or else to use an additional device for the removal, to trigger an alarm, etc.

The detection of products that are lying down can be done in different ways. To differentiate a product that is lying down from a product that is standing up, it is appropriate to be based on the height that the product occupies. Actually, the height that a product that is lying down occupies is smaller than the height that a standing product occupies, taking into account the difference already mentioned above between, on the one hand, the dimensions of its base section, and, on the other hand, the dimension of its long length. The detection module 2 therefore advantageously uses this difference in height to detect products that are lying down.

More particularly, the detection module 2 detects when the height of a product corresponds to a lying-down position. As the illustrations show, the detection module 2 essentially takes the form of a crossbeam extending above the conveyors, and along which a group of detection cells 11 are arranged, distributed transversely in relation to the conveying direction of the flow of product, to monitor the flow over its entire width. The detection cell 11 then functions by identifying the wall that is closest to it in the direction of the conveyor. This wall corresponds to the highest part of the product, namely either the axial end of the product in a standing position, such as the spout for a bottle, or a lateral wall of the product in a lying-down position, such as a rim for a bottle.

Advantageously, the detection module 2 is parameterized so that the detection cell 11 sends a signal only in the case where the wall that is opposite to it in the direction of the conveyor is separated by a distance that corresponds to a product that is lying down. If the product is standing up, its highest wall is then closer to the detection cell 11 than for a product that is lying down, and the detection cell 11 will not transmit a signal. The operation of the detection module 2 is therefore two-fold, and generates a signal for the cases where a product is lying down, and does not generate a signal in the cases where the product is standing up.

To do this, detection cells 11 can be used that are based on a principle of ultrasound or else of laser. The detection cells 11 are arranged at a certain height relative to the conveying plane on which the products are found.

The sonic cells transmit a signal that is received again after a period of time passes that depends on the distance at which the product is found below, which resends a portion of the signal. The target value for the detection cell 11 then corresponds to the time taken in the case where the product is lying down, i.e., in the case where the highest wall of the product is found at a distance from the conveying plane that corresponds to a conveying in a lying-down position.

The detection means 2 thus comprises several detection cells 11 that are distributed transversely in relation to the conveying direction of the flow of products. Each detection cell 11 is therefore dedicated to a portion of the flow in the transverse direction. The cells are then in sufficient number to cover the entire width of the flow, and so that a product that is lying down, aligned in the direction of advance of the products, can be detected by at least one cell, regardless of its position between the two edges of the flow of products. Ideally, the cumulation of the ranges of the detection cells 11 makes it possible to cover the entire width of the flow of products, so as to make the design of the detection means 2 independent of the products and their dimensions.

The use of a plurality of detection cells 11 that are based on a principle of transmission and reception of ultrasound can, however, generate interference problems, when they are arranged close to one another, which is the case when these cells are distributed beside one another transversely to the conveying direction of the products. The reflection of the wave transmitted by a cell can, for example, be received by another cell. To avoid the interference between the cells, it is then proposed not only to move them away from one another in an axis that is transverse to the advance of the products, but also to move them away from one another in the conveying direction of the products. By sufficiently moving away each cell from those that are closest to it, see FIG. 4, the mutual interference is then reduced significantly.

The intervention device 1 can, of course, be adapted to the possible different product dimensions. In particular, it must be possible to detect the products that are lying down and this for different product dimensions. A detection module 2 that is based on a principle that quantifies the height of the products can be used and makes it possible to be instantaneously functional following a change in type of product. However, the distance between, on the one hand, the cell, and, on the other hand, the wall of the product that is closest to it vertically, which makes it possible to detect whether the product is lying down or standing up, is then a good thing. It is therefore important to be able to adapt the principle to the products that exhibit other dimensions. Thus, the spacing of the detection cells 11 in relation to the conveyor can preferably be adjustable. Thus, the distance threshold between, on the one hand, the cell, and, on the other hand, the closest product wall, can remain the same. When a height exceeding this threshold is detected, the transmitted signal changes. The spacing between the detection cells 11 and the belt can be adjustable manually or by a managed actuator. Alternately, the adjustment of the intervention device 1 itself in the area of the control module 6 can ensure the taking into account of a new product geometry, for example by modifying the period that must separate the transmission and reception of the ultrasonic signal to trigger a signal.

Resorting to a detection means 2 essentially in the form of a plurality of detection cells distributed transversely to the flow makes it possible to observe continuously a section of the flow of product that corresponds, on the one hand, to the range of the detection means 2 in the longitudinal direction and therefore to the range, in this axis, of the detection cells 11 that it comprises, and, on the other hand, to the range of the detection means 2 transversely to the advance of the products, and therefore to the cumulation of the ranges, in this axis, of the cells distributed in this transverse direction. The observation of the flow, and in particular of the height of the products, is done therefore along a fixed, transverse section over the entire width of the flow. The thickness of this observed section, i.e., its length in the longitudinal direction, corresponds essentially to the detection capabilities of the detection means 2. In absolute terms, a very small thickness may also be appropriate, such as, for example, with a detection means 2 that is based on a linear camera principle extending transversely to the advance of the products.

The analysis of the flow so as to detect therein possible products that are lying down must be done at least over a sufficiently large surface area of the flow to detect, for example, a product that is lying down and oriented with its long length in the conveying direction of the flow. The analysis of the flow to detect therein products that are lying down must therefore be done not only over the entire width of the flow, normally delimited by guides, but also over a sufficient longitudinal length in the conveying direction of the products. The surface area of the flow zone to be analyzed to detect candidates therein therefore extends parallel to the conveying plane, on the one hand transversely to the advance of the products and on the other hand parallel to this advance.

The movement of the products and the fact that they normally remain immobile during their movement through the intervention device 1 make it possible to obtain data that are representative of this entire surface area on the basis only of measurements taken in the area of the same very slim section of the flow transverse to the conveying direction. The measurements taken at two different moments in the area of this transverse linear segment actually represent, in the full surface area to be observed, two transverse segments that are separated from one another by a distance that depends, on the one hand, on the period of time that separates these two measurements, and, on the other hand, on the distance traveled during this period of time by the products, taking into account the speed of the conveyors. Measurements taken over a section of the flow and during a sufficiently long period thus make it possible to achieve a representation of the minimal surface area to be observed to detect a product that would be lying down and aligned in the conveying direction. With such an analysis capability, it is therefore possible to identify exactly the contours and the orientation of a product that is lying down, which is necessary to position the gripping tool 10 correctly in relation to the conveyors for the removal phase.

In the embodiment illustrated, the detection module 2 comprises a plurality of detection cells 11. As has already been mentioned, it can be advantageous to separate them from one another in the longitudinal axis to avoid reciprocal interference or disturbances. Nevertheless, even in that case, the characteristics of the flow are identified only in a direction that is transverse to the advance of the products, the equivalence between the period of time separating two measurements and the distance that separates the products thus detected making it possible in effect to lead then to characterizing the entire flow in the longitudinal direction, as will be explained in connection with FIG. 4.

Even by longitudinally offsetting the detection cells 11 that are distributed transversely, the flow is ultimately observed only transversely. Actually, even in this configuration, two points that are offset transversely in the direction of the flow are detected by two different detection cells 11, and send signals that are offset over time or not, depending on the optional longitudinal spacing of said cells, while two points that are offset in the direction of the flow are detected by the same detection cell 11 and will generate two identical signals at different moments. The characterization of the flow in the longitudinal direction therefore is not based on different measurements, but on the same measurement taken at different moments and therefore for different products taking into account the advance of the conveyors. The flow is therefore observed only transversely and is reconstituted for the longitudinal direction on the basis of the period of time that separates the measurements.

The control module 6 can then, once a sufficient surface area of the flow will have been characterized, either instantaneously or by gradual construction in the course of the advance of the products, process this data to identify therein products that are lying down and their exact position.

It is appropriate here, however, to specify that in the particular case of a detection means 2 comprising a plurality of detection cells 11 that are distributed both transversely and longitudinally, the intermediate stage of reconstituting data that represent an entire surface area can optionally be eliminated, and a suitable algorithm can then be used to detect the products that are lying down directly from these measurement results.

In practice, the reconstitution of data representative of a surface area of the flow from measurements taken only over a segment is explained in a simplified way and in diagram form with reference to FIG. 3. FIG. 3 diagrams, in its upper portion, the surface area of the flow that must be observed as well as three detection cells, respectively a, b and c, distributed only transversely to the conveying direction, here from bottom to top. Considering their range of detection, only three measurements are necessary to characterize the entire surface area, namely one for the segment α of the full surface area, one for the segment β, and one for the segment γ. Further, their transverse range is such that the entire width of the flow is covered. The low portion of the figure diagrams the contents of a memory that stores the representative data of the measurements taken: the first line corresponds to segment α, the second line to the segment β, and the third line to the segment γ. The first column represents the measurements for the left portion of the flow, identified by the sensor c; the second column represents the measurements for the central portion of the flow, identified by the sensor b; and the right portion represents the measurements for the right portion of the flow, sensor a.

The contents of this memory are therefore updated, regularly, from three successive measurements, taken at three different moments, and between which the products have had the time to advance from the segment α to the segment β, from the segment β to the segment δ, etc. The three different measurement moments are identified by the indices 1, 2, 3. The contents of the lower square, diagramming 9 units of memory, therefore illustrate the order in which the data are updated:

measurement 1 generates three pieces of information a1, b1, c1 for the three respective sensors a, b, and c, and its data are stored in the first line;

measurement 2 generates three pieces of information a2, b2, and c2, stored in the second line;

measurement 3 generates three pieces of information a3, b3, and c3, stored in the last line.

The following measurements generate a refreshing of the contents of the memory;

line 1 takes the values of line 2, line 2 takes the values of line 3, and line 3 takes the values of a fourth measurement, and so on for any new measurement.

The contents of the memory therefore represent at each moment the status of the flow over a surface area that is much larger than the longitudinal range of the detection cells 11.

FIG. 4 illustrates the case where the detection cells 11 are also offset longitudinally. The principle of numbering is the same as for FIG. 1. The changing of the contents of the memory will then be as follows: a1 is stored during the first measurement, then a2 and b2 during the second measurement, then a3, b3 and c3, b4 and c4, and finally c5. Here, therefore, five successive measurements are needed to create the first full image of the surface area of the flow. A similar principle of refreshing the memory is then used.

Thus, according to the general principle that has just been described, the reconstitution of the characteristics of a sufficient surface area of the flow can be done from data measured by detection cells 11 that are all aligned transversely and that therefore detect instantaneously the same segment of the flow. Alternately, when the detection cells 11 are offset longitudinally, it is possible to reconstitute the surface area either by first reconstituting the transverse segment or by collecting and instantaneously storing the data identified, then representing sub-portions of the transversely non-aligned surface area.

Representative data of a surface area of the flow are therefore available for analysis and identification of predefined patterns that are representative of predefined configurations of a product that is lying down:

a value 1 for each unit of memory that is representative of a longitudinal column can thus be associated with a product that is lying down in the longitudinal axis;

a value 1 for each unit of memory that is representative of a transverse segment can be associated with a product that is lying down transversely, etc.

The detection of product that is lying down from the binary information that is representative of the surface area to be monitored can be done by applying algorithms that will analyze the data of the memory to identify predefined patterns therein that are representative of situations of products that are lying down.

Thanks to the invention, it is thus possible to guarantee that the possible products that are lying down do not reach the following machines, since they are detected, and then removed from the flow that arrives in said machine.

Although the above description is based on particular embodiments, it is in no way limiting of the scope of the invention, and modifications can be made, particularly by substitution of technical equivalents or by a different combination of all or part of the characteristics developed above.

The invention claimed is:

1. An intervention device (1) for removing lying-down products from a line for conveying products in a standing-up position on a conveyor line, the conveyor line having a surface defining a conveying plane area that conveys a flow of the products in a conveying direction (12), the surface of the conveyor line having a length extending in the conveying direction (12) and a width extending across the surface, the products having a length dimension greater than remaining dimensions, the conveyor line in use conveying the products in the standing-up position in the conveying direction (12) with the length dimension perpendicular to the conveying plane area, the intervention device (1) comprising:

a control module (6);

a detection module (2), operatively connected to the control module (6), to detect a position of the products within a detection zone (3) in a first area of the conveyor line, the detection module (2) detecting the products within the detection zone that are in a lying-down position, with the length dimension of the products parallel to the conveying plane area; and a removal module (4), operatively connected to the control module (6), to i) grab the products that the detection module (2) has detected to be in the lying-down position from a removal zone (5) and ii) remove the products having been grabbed from the conveyor line so that the removed products are no long conveyed on the conveying line, the removal zone (5) being located downstream of the detection zone (3) in a second area of the conveyor line (1), wherein the control module (6) receives information from the detection module (2) and, using the information received from the detection module (2), manages the removal module (4) to grab and remove, from the conveyor line, the products which the detection module has detected to be in the lying-down position so that the removed, lying-down products are no long conveyed on the conveying line and the products in the standing-up position continue to be conveyed on the conveying line in the conveying direction (12).

2. The intervention device (1) according to claim 1, wherein, the intervention device (1) includes the conveyor line, the conveyor line includes a conveyor (7) that advances the products in the conveying direction (12) from the detection zone (3) to the removal zone (5), and the intervention device (1) further comprises a tracker element (8), operatively connected to the control module, for tracking an advance of the conveying (7), so as to be able to follow a changing of the position of the products, and where said tracker element (8) sends a signal that is representative of said advance to the control module (6).

3. The intervention device (1) according to claim 1, further comprising:

at least one articulated robot (9) operatively connected to the removal module (4), the at least one articulated robot (9) having an end with a product gripping tool (10), wherein the removal module (4) uses the at least one articulated robot (9) and the product gripping tool (10) to grab and remove, from the conveyor line, the products which the detection module has detected to be in the lying-down position in the detection zone.

4. The intervention device according to claim 1, further comprising:

a product gripping tool (10) operatively connected to the removal module (4) and located above the surface of the conveyor line, wherein the removal module (4) moves the product gripping tool (10) to grab the products from above, and remove, from the conveyor line, the products which the detection module has detected to be in the lying-down position in the detection zone.

5. The intervention device according to claim 1, further comprising at least one product gripping tool (10) operatively connected to the removal module (4), the at least one product gripping tool (10) including a pincer, wherein the removal module (4) uses the only the pincer of the at least one product gripping tool (10) to grab the products which the detection module has detected to in the lying-down position in the detection zone, and then the at least one product gripping tool (10) removes the grabbed products from the conveyor line.

6. The intervention device according to claim 1, further comprising at least one product gripping tool (10) operatively connected to the removal module (4), the at least one product gripping tool (10) including a suction cup, wherein the removal module (4) uses only the suction cup of the at least one product gripping tool (10) to grab the products which the detection module has detected to in the lying-down position in the detection zone, and then remove the grabbed products from the conveyor line.

7. The intervention device according to claim 1, further comprising a position detection cell (11) operatively connected to the detection module (2) to visually identify the products within the detection zone (3) that are in the lying-down position, the position detection cell (11) comprises at least one camera located above the conveying plane area and aiming down to the conveying plane area, the camera providing an image of the products on the conveying plane area below the camera for use by the detection module (2) in distinguishing the products in the lying-down position from the products in the standing-up position.

8. The intervention device according to claim 1, further comprising a height detection cell (11), operatively connected to the detection module (2) to detect a height of a highest part of the products relative to the conveying plane area, the detection module (2) using the detected height of the highest part of the products to identify the products within the detection zone (3) that are in the lying-down position.

9. The intervention device according to claim 8, further comprising a means for calibrating the detection module (2).

10. The intervention device according to claim 9, the means for calibrating the detection module (2) modifying a distance of the detection cell (11) relative to the conveying plane area on which the products are located.

11. The intervention device according to claim 1, where the detection module (2) analyzes the detection zone (3), with the detection zone, in relation to the conveying direction (12) of the products:
    extending longitudinally over a distance long enough to detect instantaneously the products in the lying-down position on the conveying plane and aligned in the longitudinal direction, and
    also extending transversely.

12. The intervention device according to claim 1, where the detection module (2) analyzes a section of the flow that extends transversely to the conveying direction (12).

13. The intervention device according to claim 8, where the detection module (2) comprises a plurality of the height detection cells (11), distributed and separated relative to one another in a direction that is transverse to the conveying direction (12) and located above the detection zone (3).

14. The intervention device according to claim 13, where the height detection cells (11) are also distributed and spaced apart relative to one another in the conveying direction (12).

15. The intervention device according to claim 7, wherein, the detection module detects, from the image, the products being in the lying-down position based tracking a label on the products in the image, wherein the label is visible from above only for the products in the lying-down position, the label being visible indicating that the product in in the lying-down position.

16. The intervention device according to claim 8, wherein the height detection cell (11) comprises plural height detection cells (11) that detect a crossbeam extending above the conveying plane area, the detected crossbeam corresponding to an axial end of the products in the standing position and to a lateral wall of the products in the lying-down position.

17. The intervention device according to claim 8, wherein, the height detection cell (11) is located above the conveying plane, the height detection cell determining a vertical distance between the height detection cell and a highest part of the products located on the conveying plane below the height detection cell, the detection module (2), using the vertical distance to determine the products in the lying-down position and the products in the standing-up position.

18. The intervention device according to claim 1, wherein, the removal modules (4) being configured to grab and remove the products of the group consisting of bottles, cans, and jars by the removal module (4) reaching down from above the removal zone to grab and remove the products that the detection module (2) has detected to be in the lying-down position.

* * * * *